Aug. 22, 1961 C. K. LEEPER 2,996,878
RAM JET FUEL CONTROL
Filed June 26, 1952 2 Sheets-Sheet 1

CHARLES K. LEEPER
INVENTOR.

BY
ATTORNEYS

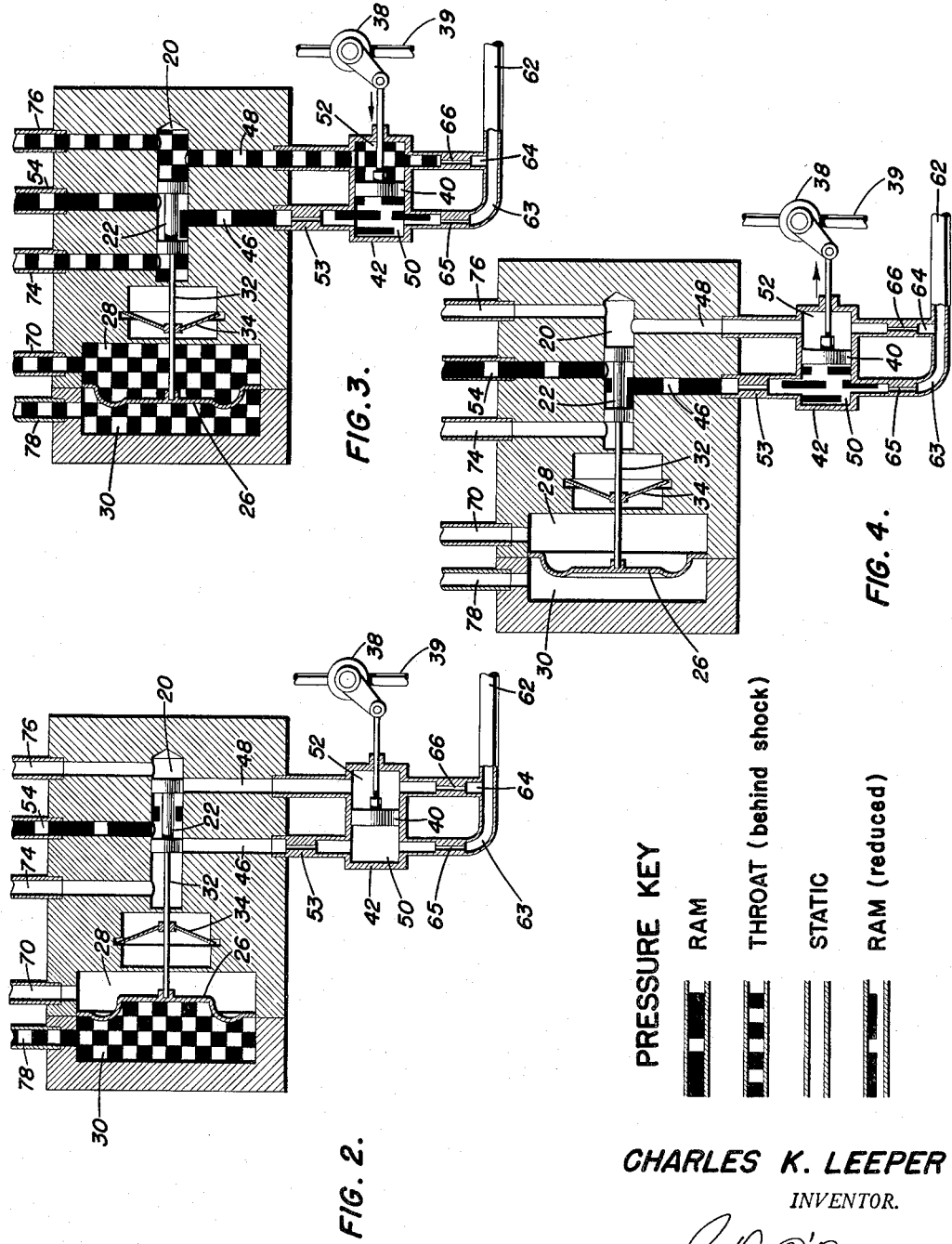

United States Patent Office 2,996,878
Patented Aug. 22, 1961

2,996,878
RAM JET FUEL CONTROL
Charles K. Leeper, Cambridge, Mass., assignor to the United States of America as represented by the Secretary of the Navy
Filed June 26, 1952, Ser. No. 295,634
1 Claim. (Cl. 60—35.6)

The present invention relates, in general to an improved fuel control system and apparatus for a ramjet type of aerial missile. More particularly, the invention relates to a fuel-metering-valve control system and apparatus for a ramjet type of aerial missile which employs the position of the shock wave in or in front of the duct of the ramjet missile to provide the primary control pulses. This invention is an improvement of the control system and apparatus shown and described in U.S. patent application Serial Number 295,633, filed June 26, 1952.

In a properly functioning ramjet, a shock wave is found either at some point in the duct or at some point ahead of the duct of the ramjet. The exact location is determined by the speed of the ramjet. Excess pressure in the combustion chamber forces the shock wave forward away from its best position; while insufficient pressure permits the shock wave to move rearwardly from that position. Excess pressure is caused generally by an over-rich air-fuel mixture, and insufficient pressure by a lean mixture. A valve-control system for regulating the mixture to secure the desired positioning of the shock wave has been described in the related application mentioned above. This system employs a mechanism having two pressure-operated piston valves to control the operation of the fuel-metering valve. In the restricted space available in a ramjet missile this double-valve construction is undesirable.

Accordingly, the principal object of the present invention is to provide a system and apparatus for controlling a metering valve which employs only one piston valve, with a resultant decrease in the space required for installation.

Another object of the invention is to provide a system and apparatus for positioning the shock wave for assuring optimum operation of an aerial missile of the ramjet type.

And another object of the invention is to provide control apparatus that is economical to manufacture, compact, easy to install in an aerial missile, and which is reliable in operation therein.

Other objects and many of the attendant advantages of this invention will be readily appreciated as the same becomes better understood by reference to the following detailed description when considered in connection with the accompanying drawings wherein:

FIG. 2 is a schematic view of the apparatus showing the valve mechanism under condition of normal burning;

FIG. 3 is a schematic view of the apparatus showing the valve mechanism under condition of excess fuel flow; and FIG. 4 is a schematic view of the apparatus showing the valve mechanism under condition of reduced fuel flow.

Figure 1:
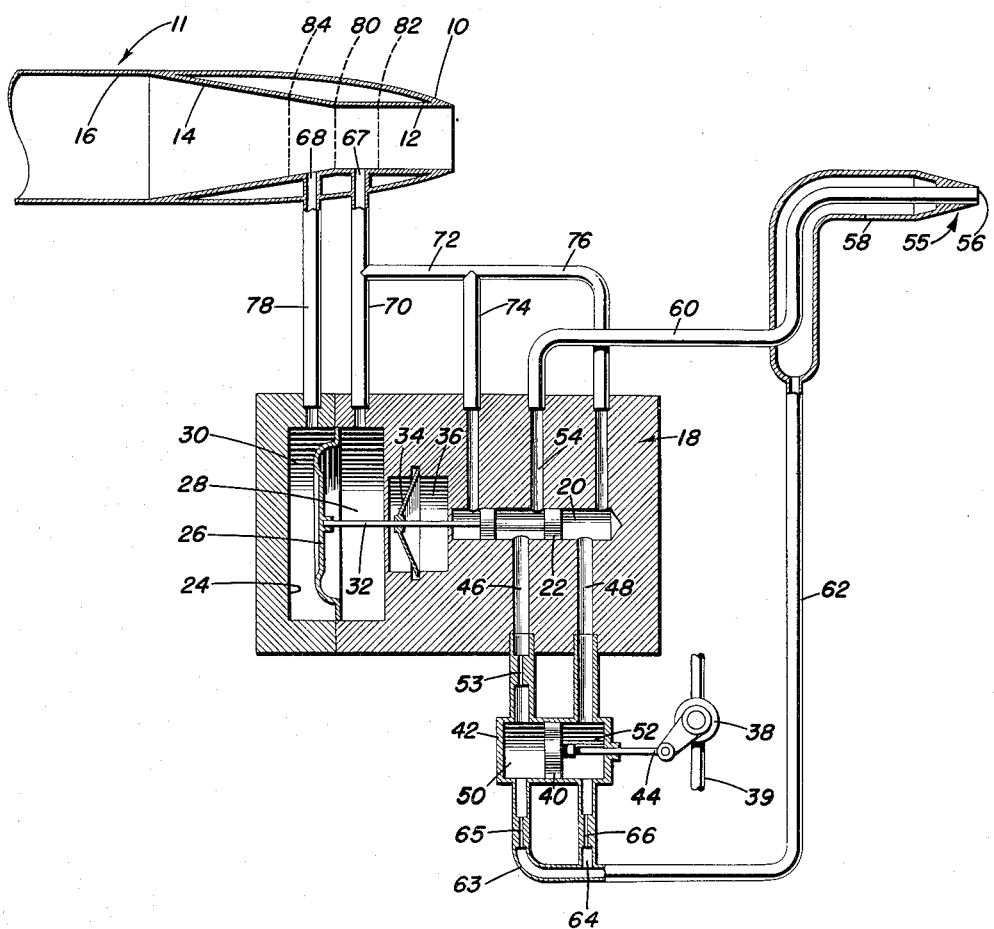
FIG. 1 is a schematic view of an aerial missile of the ramjet type embodying the system and apparatus of the invention.

In accordance with the invention, a control mechanism is provided for adjusting the fuel valve of an aerial missile of the ramjet type in order to provide for optimum operation of the ramjet as indicated by the position of a shock wave in or ahead of the throat thereof. This control mechanism includes throat-pressure orifices located in the throat of the ramjet, together with a source of ram-pressure air, a static-pressure orifice, a piston valve, and operating means for the piston valve which is controllable by the pressures supplied by the throat-pressure orifices, and a fuel-valve-operating piston and cylinder.

Referring now to the drawings, there is shown in FIG. 1 the forward portion 10 of an aerial missile 11 of the ramjet type, which contains a central duct having a throat 12, a frusto-conical type diffuser 14 and a combustion chamber 16.

A metal block 18 forms the base of the control apparatus and is mounted in a convenient position in the ramjet 10, such as between the inner and outer walls thereof. A valve chamber 20 in the block 18 houses a piston valve 22. A chamber 24 coaxial with the valve chamber 20 is spanned by a diaphragm 26 which divides it into inner and outer compartments 28 and 30. Diaphragm 26 is connected to the valve 22 by a piston rod 32.

A Belleville spring 34 located in a spring chamber 36 between the diaphragm 26 and valve chamber 20 is fastened to the piston rod 32 and serves to control the motion of the piston valve 22, and, at rest, holds the valve assembly in the outer position (to the left). Spring 34 is reversible under load and capable of self-restoration upon release of the load.

A valve 38 in the fuel line 39 of the ramjet 11 is actuated by a piston 40 operating in a cylinder 42 and connected to the valve 38 by a rod 44.

Ducts 46 and 48 connect the valve chamber 20 to the left- and right-hand ends 50 and 52 of the cylinder 42, respectively. The ducts 46 and 48 are so located that when the piston valve 22 is in its deflected, inner position, its inner and outer heads cover and close the ducts 46 and 48, respectively. When the piston valve 22 is in its at-rest, or outer, position, the duct 46 opens into the middle section of the valve 22, and the duct 48 opens into the outer end of the valve chamber 20. A constriction 53 is located in the duct 46. A supply duct 54 communicates with the valve chamber 20, opening into the middle section of the valve 22.

A Pitot tube assembly 55 having a dynamic or ram-pressure orifice 56 and a static pressure orifice 58 is mounted on and projects forward from the extreme forward end of the ramjet body 10. The ram-pressure orifice 56 is connected to the supply duct 54 by a tube 60; and the static pressure orifice 58 is connected to the valve-actuating cylinder 42 by a tube 62 and branch tubes 63 and 64 to the left-hand and right-hand ends 50 and 52 of the cylinder 42, respectively. Constrictions 65 and 66 are located in the branch tubes 63 and 64, respectively.

A pair of longitudinally spaced orifices 67 and 68 are placed at the location determined to be best for the shock wave in normal operation. The front orifice 67 is connected to the inner compartment 28 of the valve mechanism by a tube 70 and, by a branch tube 72, and sub-branches 74 and 76 thereof, to the inner and outer ends of the valve chamber 20. The rear orifice 68 is connected to the outer compartment 30 of the valve mechanism by a tube 78.

Referring now to FIGS. 1 and 2, in normal operation the shock wave is located at 80, between the orifices 67 and 68. The static pressure ahead of the shock wave at the front orifice 67 is approximately equal to the ambient static pressure as determined at the orifice 58 of the Pitot-tube assembly 55, while that behind the shock wave at the orifice 68, due to the reduced velocity of the air, is considerably higher but, by reason of its flow, not as high as the ram pressure determined at the ram-pressure orifice 56 of the Pitot-tube assembly. Under these conditions, the diaphragm 26 is subjected, on its inner side, to a low pressure from the orifice 67 applied through the tube 70 and the inner compartment 28, and, on its outer side, to a high pressure from the orifice 68 applied through the tube 78 and the outer compartment 30.

As a result of the unbalance of pressures acting on the diaphragm 26, it is deflected inward and pushes the piston rod 32 and the piston valve 22 to the position shown in FIG. 2 from the initial, unloaded position shown in FIG. 1. In so moving the piston valve 22, the Belleville spring 34 is deflected and reversed in shape, as shown. With the piston valve 22 in the inward position, its heads close off the upper ends of the ducts 46 and 48, thus preventing the admission of air pressure thereto. Since the ends 50 and 52 of the cylinder 42 communicate with the static pressure orifice 58 of the Pitot-tube assembly 55 through the constrictions 65 and 66 and the tubes 62, 63 and 64, the pressures therein are equal, no force is exerted on the piston 40 to move the fuel valve 38, and it is held motionless by friction.

Referring now to FIG. 3 as well as to FIG. 1, when, during operation, a condition occurs in which the fuel flow is greater than normal, the pressure in the combustion chamber 16 increases and the shock wave is driven to some position 82 forward of the orifice 67 (FIG. 1). In this case, the pressure at the orifice 67 is the same as that at the orifice 68; namely, the high pressure behind shock. Under this condition, the pressures on the opposite sides of the diaphragm 26, in the compartments 28 and 30, are equal and the Belleville spring 34 returns to its original shape, drawing the piston valve 22 to the position shown in FIG. 3.

With the piston valve 22 in the position shown in FIG. 3, the inner head of the valve 22 is inward, or to the left, of the upper end of the duct 46 thereby admitting ram-pressure air from the supply duct 54 to the duct 46 and from it to the left-hand end 50 of the cylinder 42 through the constriction 53. Simultaneously, the high pressure from the orifice 67 is conveyed by tubes 70, 72 and 76 to the outer end of the valve chamber 20 and from there through the duct 48 to the right-hand end 52 of the cylinder 42. Because of the action of the constriction 66 in the outlet tube 64 from the right-hand end 52 of the cylinder 42 to the static pressure orifice 58, the pressure in end 52 is practically equal to that behind the shock wave at the orifice 67; while the action of the constrictions 53 and 65 associated with the left-hand end 50 of the cylinder 42 is to reduce the ram-pressure supplied in the duct 46 to a value, in the left-hand end 50, intermediate between that behind the shock wave and the ambient static pressure. The greater pressure in the right-hand end 52 of the cylinder 42 acts on the piston 40 therein to force it to the left to close the fuel valve 38 in the fuel line 39 at a rate determined by the friction of the piston 40 in the cylinder 42.

Referring finally to FIGS. 1 and 4, when fuel flow is less than normal, the pressure in the combustion chamber 16 decreases and the shock wave drops back to a position 84 rearward of the orifice 68. In this case again, the pressures at the orifices 67 and 68 are equal, and at approximately the ambient static pressure; thus the pressures on the diaphragm 26 of the primary valve mechanism are balanced so the Belleville spring 34 takes its original shape and holds the piston valve 22 in the position shown in FIG. 4. Ram-pressure air is admitted from the supply duct 54 through the center of the piston valve 22 to the duct 46, and thence, at reduced pressure, to the left-hand end 50 of the cylinder 42, as described above. At the same time, pressure in the right-hand end 52 of the cylinder 42 is, by reason of its connection with the orifice 67 through the duct 48, the outer end of the valve chamber 20 and the tubes 70, 72, 76, and with the static pressure orifice 58 in the Pitot-tube assembly 55 through the constriction 66 and the tubes 62 and 64, approximately equal to the ambient static pressure. The greater pressure in the left-hand end 50 of the cylinder 42 acts on the piston 40 to force it to the right to open the fuel valve 38.

Valve action in either direction, as described above, changes the air-fuel ratio in such a way as to bring the shock wave back to the position 80 between the orifices 67 and 68. When the shock wave reaches this position, the conditions shown in FIG. 2 prevail and, as described in connection with this figure, motion of the valve ceases, holding the air-fuel ratio at the desired value.

Briefly summarizing the foregoing, an aerial missile 11, after being launched, continues along its trajectory under its own source of power which is developed by the burning of the fuel mixture in the combustion chamber 16 and the expansion of the liberated gases through an exit nozzle (not shown), which develop thrust forces to propel the missile 11 forward.

A shock wave, such as 80 in FIG. 1, is found in the forward portion of the duct of the ramjet missile 11, or at some point ahead of the missile 11. By providing the system and apparatus described previously, it is possible to control the air-fuel ratio and the position of the shock wave in order to maintain optimum operation of the missile.

Obviously many modifications and variations of the present invention are possible in the light of the above teachings. It is therefore to be understood that within the scope of the appended claim the invention may be practiced otherwise than as specifically described.

What is claimed is:

In combination with a fuel-metering valve for a ramjet missile, a control mechanism for adjusting the air-fuel mixture to produce optimum positioning of a shock wave created by said missile while in flight, said shock wave being located in the vicinity of the forward end of the duct of said missile, including a housing, a cylinder in said housing and having a piston therein, said piston being operatively connected to said fuel-metering valve, a first chamber having a diaphragm therein, a second chamber having a piston valve therein, said diaphragm being arranged to actuate said piston valve, a snap spring associated with said piston valve and diaphragm to hold said piston valve in its extreme positions, a pair of laterally directed orifices longitudinally spaced along said duct of said missile and communicating with the air stream passing through said missile while said missile is in flight at the optimum position of the shock wave in the vicinity of the forward end of said missile and connected to said diaphragm chamber on opposite sides of said diaphragm, passageways connecting the forward one of said orifices and the extremities of said second chamber, a source of ram-pressure air communicating with said piston valve at its central portion, a static-pressure orifice connected with the extremities of said cylinder through constrictions, a constricted transfer duct between said piston valve and one end of said cylinder, said transfer duct being so located with respect to said piston valve as to communicate with the central portion thereof when said piston valve is in "at-rest" position and to be closed by said piston valve when said piston valve is in "deflected" position, and a second transfer duct between an end of said second chamber and the other end of said cylinder, said second duct being so located with respect to said piston valve as to communicate with the end of said second chamber when said piston valve is in "at-rest" position and to be closed by said piston valve when said piston valve is in "deflected" position.

References Cited in the file of this patent

UNITED STATES PATENTS

| | | |
|---|---|---|
| 2,540,594 | Price | Feb. 6, 1951 |
| 2,566,319 | Deacon | Sept. 4, 1951 |
| 2,693,675 | Schaffer | Nov. 9, 1954 |